(12) United States Patent
Rahja et al.

(10) Patent No.: US 8,824,854 B2
(45) Date of Patent: Sep. 2, 2014

(54) METHOD AND ARRANGEMENT FOR TRANSFERRING MULTIMEDIA DATA

(75) Inventors: Petri Oskari Rahja, Espoo (FI); Timo Johannes Rinne, Helsinki (FI)

(73) Assignee: P2S Media Group Oy, Helsinki (FI)

( * ) Notice: Subject to any disclaimer, the term of this patent is extended or adjusted under 35 U.S.C. 154(b) by 99 days.

(21) Appl. No.: 13/372,963

(22) Filed: Feb. 14, 2012

(65) Prior Publication Data

US 2013/0044994 A1 Feb. 21, 2013

(30) Foreign Application Priority Data

Feb. 15, 2011 (FI) .................................. 20115142

(51) Int. Cl.
*H04N 5/932* (2006.01)
(52) U.S. Cl.
USPC ........................................... 386/210; 386/200
(58) Field of Classification Search
None
See application file for complete search history.

(56) References Cited

U.S. PATENT DOCUMENTS

| | | | |
|---|---|---|---|
| 4,389,109 A | 6/1983 | Taniguchi | |
| 2001/0015759 A1 | 8/2001 | Squibbs | |
| 2002/0044690 A1 | 4/2002 | Burgess | |
| 2004/0036774 A1 | 2/2004 | Nichols | |
| 2005/0110880 A1 | 5/2005 | Parulski et al. | |
| 2006/0104616 A1* | 5/2006 | Shellshear | 386/96 |
| 2007/0189333 A1 | 8/2007 | Naaman et al. | |
| 2007/0255745 A1 | 11/2007 | Gargi | |
| 2008/0018737 A1* | 1/2008 | Suzuki et al. | 348/143 |
| 2010/0036676 A1* | 2/2010 | Safdi et al. | 705/2 |
| 2010/0165119 A1 | 7/2010 | Tang | |
| 2011/0085025 A1* | 4/2011 | Pace et al. | 348/49 |
| 2012/0089579 A1* | 4/2012 | Ranade et al. | 707/693 |

FOREIGN PATENT DOCUMENTS

| | | |
|---|---|---|
| EP | 0376618 A2 | 7/1990 |
| FR | 2937125 A1 | 4/2010 |
| WO | 0233955 A2 | 4/2002 |

OTHER PUBLICATIONS

Arena PLM Overview. Datasheet [online]. ManofilT, 2009 [ladattu Oct. 26, 2011]. Ladattu Internetista: <URL: http://www.manofit.com/Arena_PLM_Overview_Datasheet.pdf> koko dokumentti.
European Search Report, 12154420.9-1527, Jun. 6, 2012.
Extended European search report issued concerning the patent application No. 12154420.9-1527 Dated Jun. 6, 2012.

* cited by examiner

*Primary Examiner* — William C. Vaughn, Jr.
*Assistant Examiner* — Eileen Adams
(74) *Attorney, Agent, or Firm* — Ziegler IP Law Group, LLC.

(57) ABSTRACT

A method, arrangement and computer program for transferring multimedia data from a multimedia data capture device to a metadata recording device via a data communication connection and for enhancing the multimedia data using metadata captured by the recording device. The method involves establishing a data communication connection between the data capture device and a metadata recording device, determining the time difference between the clocks of the devices, receiving a captured multimedia data item from the multimedia data capture device. having a first timestamp indicating the creation time of the data item, recording metadata having a second timestamp indicating the creation time of the metadata according to the clock of the metadata recording device, and associating the captured multimedia data item with the metadata, utilizing the first and the second timestamps, where at least one timestamp is corrected using the time difference between the clocks of the two devices.

16 Claims, 4 Drawing Sheets

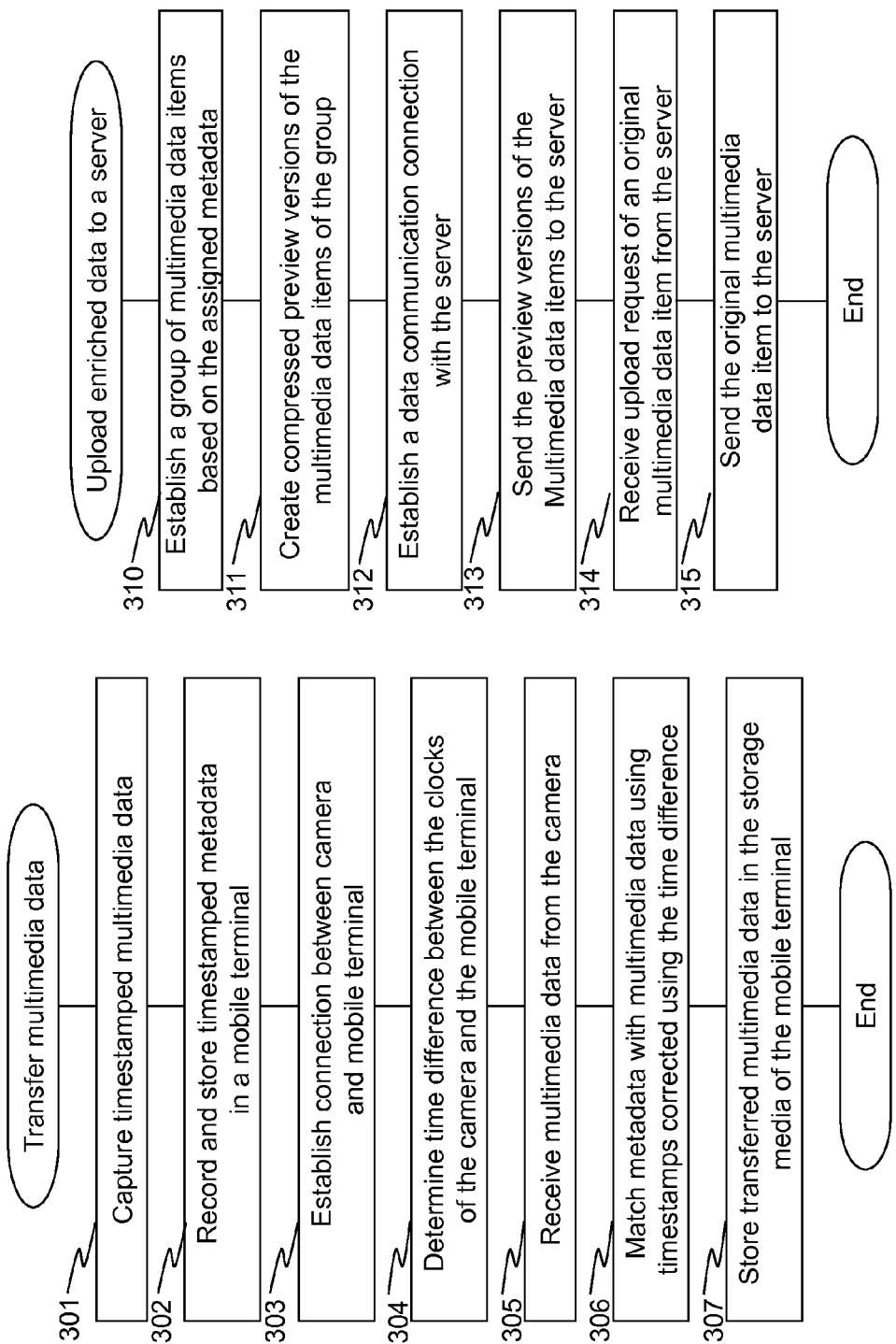

METHOD AND ARRANGEMENT FOR TRANSFERRING MULTIMEDIA DATA

TECHNICAL FIELD

The aspects of the disclosed embodiments relate to a method and arrangement for transferring multimedia data from a multimedia data capture device to a data management service.

BACKGROUND

Multimedia data capture devices capable of producing content for professional purposes, e.g. digital SLR cameras or video cameras, have advanced functionality for their primary purpose, e.g. for capturing digital images. They also have some connectivity means for connecting the device to a network or to another device for uploading the captured images from the storage media of the camera to another storage media. Such devices have quite limited means for connecting to a service over network, especially in cases, where the service requires not only the captured multimedia data but also some accompanying data, e.g. service specific meta-data for the multimedia data.

Mobile terminals, e.g. smart phones, have means for downloading locally executable software to the memory of the terminal device. Such software may for example be a client software of a service provided over a data communication network, e.g. the Internet.

Mobile terminals are also connectable to devices such as cameras using a wired or wireless data communication means. The wired data communication means may be e.g. a USB (Universal Serial Bus) connection. The wireless data communication means may utilize be e.g. a Bluetooth or a Wireless LAN connection between the terminal and the camera.

Because the professional data capture devices don't have proper means for executing service specific client software in the memory space of the device and they may also lack some means, e.g. location detection means such as GPS, for recording metadata useful for the captured multimedia data, a solution is needed for integrating the professional data capture devices to services that require a client software for e.g. producing metadata for the captured multimedia data.

It would be advantageous to provide a method and arrangement for transferring data from a capture device to a service and for enriching the data in the transfer process.

SUMMARY

An aspect of the disclosed embodiments is a method for transferring multimedia data from a multimedia data capture device, e.g. a camera, to a metadata recording device via a data communication connection and for enhancing the multimedia data using metadata captured by the metadata recording device. The method may comprise any, any combination or all of the steps of establishing a data communication connection between the data capture device and a metadata recording device; determining the time difference between the clocks of the data capture device and the metadata recording device; receiving at least one captured multimedia data item, e.g. at least one still image or at least one video stream, from the multimedia data capture device, the captured multimedia data item comprising a first timestamp indicating the creation time of the data item according to the clock of the data capture device; recording, using the metadata recording device, metadata comprising a second timestamp indicating the creation time of the metadata according to the clock of the metadata recording device; associating the captured multimedia data item with the metadata, wherein the association is utilizing the first and the second timestamps, of which timestamps at least one timestamp, e.g. the timestamp of the multimedia data item, is corrected using the determined time difference between the clocks of the data capturing and metadata recording devices.

The data capture device may be e.g. a digital camera, e.g. a SLR camera or a video camera.

The metadata recording device may be e.g. a mobile terminal, e.g. a mobile phone, portable (laptop) computer or a tablet computer.

In an embodiment, the metadata recording device is a mobile terminal, e.g. a cellular phone, advantageously a smart phone.

The data communication connection between the data capture device and the metadata recording device may be e.g. wired connection, e.g. via Universal Serial Bus cable or a wireless connection, e.g. via a Bluetooth or Wireless LAN. In an embodiment, the metadata recording device acts as a Wireless LAN base station. The metadata recording device may also comprise data communication means for connecting the device to at least one server computer via a data communication network, e.g. the Internet.

The metadata may comprise, along with the timestamp information, e.g. information about the geographic location of the device capturing the metadata. Metadata may also comprise streaming data, e.g. a voice stream, produced by the metadata capturing device. In an embodiment, the metadata capturing device comprises means for recognizing voice commands. A recognized command may trigger for example the creation of additional metadata or executing a command in the metadata capturing device. The command may comprise e.g. determining the current location of the metadata capturing device, detecting some observable characteristics, e.g. temperature, of the current location or establishing a data communication connection to a server for the purpose of immediately sending a multimedia data item and/or metadata to the server.

In an embodiment, a plurality of captured multimedia data items may be grouped together based on the associated metadata. A group may be formed thus of multimedia data items shot e.g. in a specific location and/or within a specific time frame. A compressed version of the multimedia data items of a group may be created. The compressed multimedia data items may be sent from the metadata recording device to a server for publishing purposes. The metadata recording device may receive a request from the server to upload the original version of a compressed multimedia data item.

In a preferred embodiment, the captured multimedia data is sent to the server via the metadata recording device. The step of associating the multimedia data with the metadata is advantageously performed in the metadata recording device.

Another aspect of the disclosed embodiments is an arrangement for transferring multimedia data, the arrangement comprising a metadata recording device communicatively connectable to a multimedia data capture device. The metadata recording device is adapted to comprise any of the following means for:

Another aspect of the disclosed embodiments is an arrangement comprising a multimedia data capture device connectable to a metadata recording device for transferring multimedia data from to the metadata recording device to the metadata recording device via a data communication connection and for enhancing the multimedia data using metadata captured by the metadata recording device. The arrangement is characterized in that it comprises in the metadata recording device any combination of the following means for establishing a data communication connection between the data capture device and a metadata recording device; determining the time difference between the clocks of the data capture device and the metadata recording device; receiving at least one captured multimedia data item from the multimedia data capture device, the captured multimedia data item comprising a first timestamp indicating the creation time of the data item according to the clock of the multimedia data capture device; recording, using the metadata recording device, metadata comprising a second timestamp indicating the creation time of the metadata according to the clock of the metadata recording device; associating the captured multimedia data item with the metadata, wherein the association is utilizing the first and the second timestamps, of which timestamps at least one timestamp is corrected using the determined time difference between the clocks of the data capturing and metadata recording devices.

Yet another aspect of the disclosed embodiments is a computer program product for transferring multimedia data from a multimedia data capture device to a metadata recording device via a data communication connection and for enhancing the multimedia data using metadata captured by the metadata recording device. The computer program product is characterized in that the computer program product comprises any combination of the following computer executable instructions for establishing a data communication connection between the data capture device and a metadata recording device; determining the time difference between the clocks of the data capture device and the metadata recording device; receiving at least one captured multimedia data item from the multimedia data capture device, the captured multimedia data item comprising a first timestamp indicating the creation time of the data item according to the clock of the multimedia data capture device; recording, using the metadata recording device, metadata comprising a second timestamp indicating the creation time of the metadata according to the clock of the metadata recording device, and associating the captured multimedia data item with the metadata, wherein the association is utilizing the first and the second timestamps, of which timestamps at least one timestamp is corrected using the determined time difference between the clocks of the data capturing and metadata recording devices.

Some embodiments of the disclosed embodiments are described herein, and further applications and adaptations thereof will be apparent to those of ordinary skill in the art.

BRIEF DESCRIPTION OF DRAWINGS

In the following, the aspects of the disclosed embodiments are described in greater detail with reference to the accompanying drawings in which FIG. 3a shows a flow chart of an exemplary method of transferring multimedia data according to an embodiment, FIG. 3b shows a flow chart of an exemplary method of uploading enriched data to a server according to an embodiment.

DETAILED DESCRIPTION OF THE DRAWINGS

Figure 1:
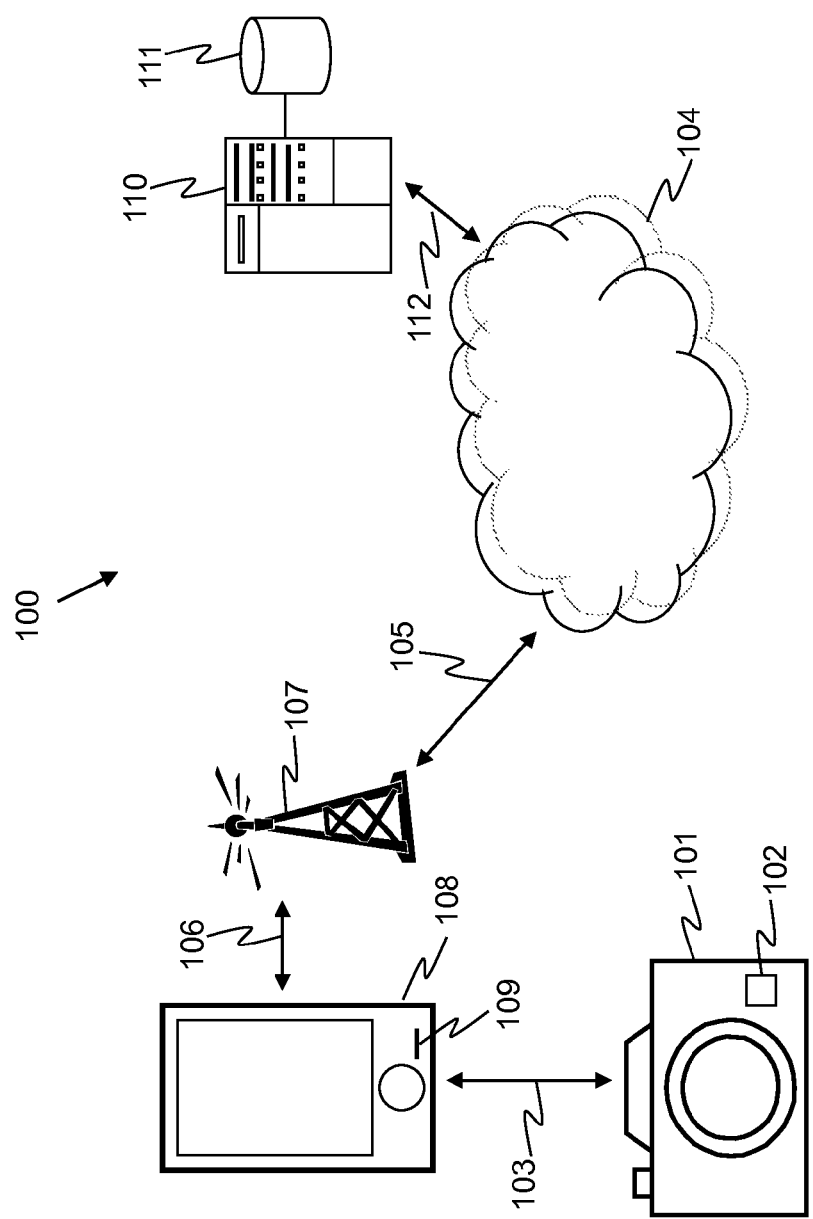
FIG. 1 shows an exemplary arrangement of an embodiment.

FIG. 1 depicts an arrangement according to a preferred embodiment of the disclosure. The arrangement 100 comprises a multimedia data capture device 101, e.g. a digital camera, which advantageously is capable of capturing high quality still images and/or video streams suitable for professional uses. The capture device 101 has a local storage media 102, e.g. a flash memory card, to which the captured data is initially stored. The capture device 101 is communicatively connectable 103 to a metadata recording device 108, e.g. a mobile phone. The communication connection 103 may be e.g. a wired connection, e.g. USB (Universal Serial Bus) connection, or a wireless connection, e.g. Bluetooth™ or Wireless LAN connection. The capture device 101 sends multimedia data from its storage device 102 to the device 108 via the connection 103, preferably as batches of several images/streams per batch.

The metadata recording device 108 is advantageously a smart phone capable of downloading and locally executing software program code. The software program code may be a client application of a service whose server application is running on the server 110 of the arrangement. The metadata recording device 108 also has some data recording means 109 for creating data usable as the metadata of the multimedia content captured by device 101. The recording means may for example comprise a microphone and/or means for determining the current location of the device 108. The device 108 is communicatively connectable 106 to a wireless data communication network 107, e.g. a WLAN network or a 2G or 3G telecommunication network which is further connected 105 to a public data communication network 104, e.g. the Internet.

Finally, the arrangement comprises a server computer 110 which has a storage media device 111 for storing multimedia and metadata received from the device 108 over a data communication connection 112.

Figure 2B:
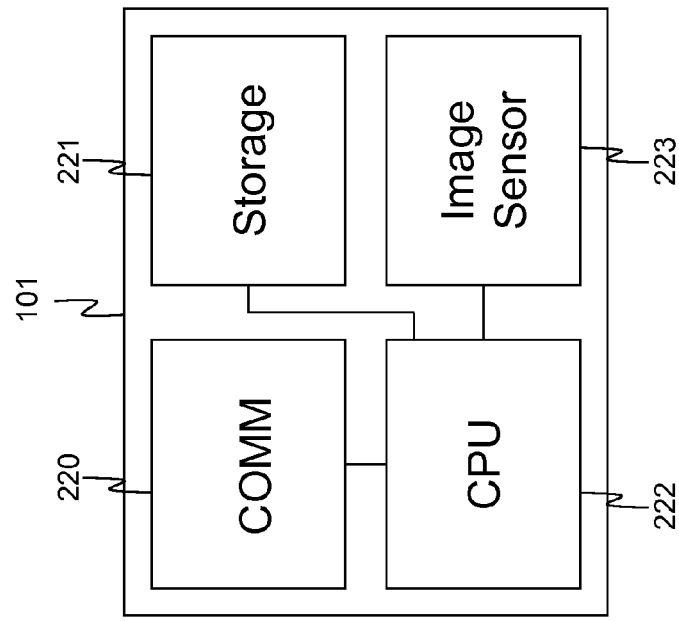
FIG. 2b shows an exemplary diagram of a multimedia capture device of an embodiment.
Figure 2A:
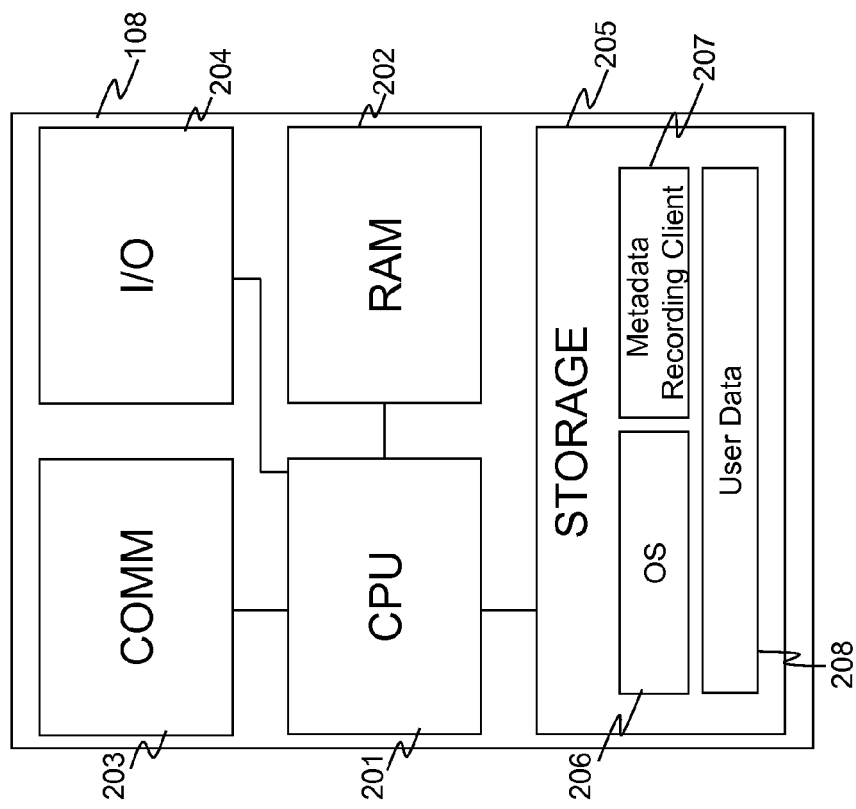
FIG. 2a shows an exemplary diagram of a metadata recording device of an embodiment.

FIG. 2a depicts a greatly simplified diagram of components of a metadata recording device 108, advantageously a smart phone, of an embodiment of the present disclosure. The device comprises a central processing unit 201 for executing computer executable instructions in the random access memory 202 of the device. The device has I/O means 204, e.g. microphone, loudspeaker, keyboard and/or display for facilitating data input and output to/from the user. The device also has communication means 203 for connecting the device to the data capture device using connection 103 and to the wireless data communication network using connection 106. Finally, the device has data storage means 205, e.g. built-in and/or detachable flash memory. The data storage comprises e.g. the operating system 206 of the device, a client application 207 for recording metadata for images captured using multimedia data capture device 101 of the arrangement. The metadata recorded by the device and the multimedia data received by the device are stored in the user data area 208 of the storage media.

FIG. 2b depicts a greatly simplified diagram of components of a metadata capturing device 101, advantageously a video camera or a digital still camera, e.g. a digital SLR camera. The device 101 comprises a CPU 222, an image sensor 223 for capturing multimedia data, storage means 221, e.g. a flash memory card for storing the captured multimedia data and communication means 220, e.g. a USB port or wireless LAN communication means, for transmitting captured multimedia data to a second device, e.g. the metadata recording device 108.

FIG. 3a illustrates the method of transferring multimedia data from multimedia data capturing device to a metadata recording device 301 according to an embodiment of the present disclosure. In the step 301, some multimedia data, e.g. a digital still picture or a video stream is captured in the multimedia data capturing device 101. The multimedia data comprises a timestamp indicating the time of creation of the data according to the clock of the device 101. Separately, in step 302, some timestamped metadata is recorded and stored in the mobile terminal 108. Later, preferably after a plurality of images or streams have been captured in camera 101, a connection (103 in FIG. 1) is established between the multimedia capturing device 101 and the metadata recording device 108 for the purpose of transferring multimedia data items to the memory means 208 of the metadata recording device 108. While the connection is being established, the time difference of the clocks of the devices 101 and 108 is determined for the purpose of correcting the timestamps of multimedia data and/or metadata later.

The transfer of data takes place in step 305. When the multimedia data is received in the metadata recording device 108, the metadata recorded by the metadata recording device in step 302 is matched in step 306 with the multimedia data captured in step 301 using timestamps corrected using the time difference information determined in the step 304. Finally in step 307, the transferred multimedia data, which has now been matched with metadata recorded by the device 108 is stored in the storage media of the device 108.

The multimedia data may now be organized in the metadata recording device 108 in various manners utilizing the metadata matched with the multimedia data. FIG. 3b illustrates an exemplary method of organizing the multimedia data according to an embodiment of the present disclosure. A plurality of multimedia data items, e.g. still images or video streams, are grouped together 310 according to some metadata recorded by the metadata recording device 108. For example, pictures shot in a certain location may be grouped together based on the location data recorded by the metadata recording device 108. Next, in step 311, compressed preview versions of the multimedia data items of the group are created. The level of compression may be quite high, resulting low resolution images that are not suitable for any publishing use but are suitable for selecting the original figure. Next, a data communication connection is established 312 with the server (110 in FIG. 1) of the arrangement for the purpose of sending 313 the compressed preview versions to the server. The preview images are then published in the server to at least one user, who can select one or multiple images/streams from the group. In step 314, the metadata recording device receives from the server a request to upload the original copy of at least one image/stream of the group. The metadata recording device then sends in step 315 the requested original multimedia data item(s) to the server 110. The uploading may occur immediately after receiving the request from the server or it may be started later, when the available wireless network connection is good enough for transferring the intended volume of data.

Figure 4:
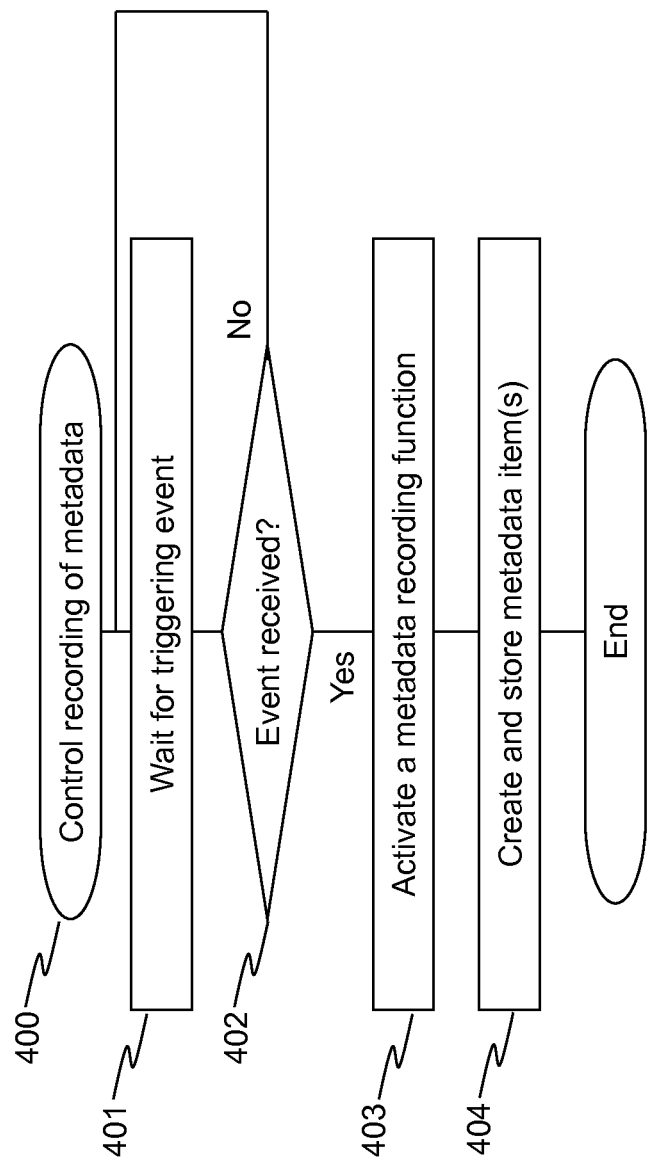
FIG. 4 shows an exemplary method of controlling recording of metadata according to an embodiment.

FIG. 4 illustrates an exemplary method of controlling metadata recording process 400 in the metadata recording device 108. For various reasons, including power and other resource consumption optimization of the device 108, it may not be practical to keep the entire metadata recording process or a part of it active continuously. In the embodiment shown in FIG. 4, the metadata recording client software 207 of the device 108 waits 401 for an event that triggers at least one metadata recording function. The event may occur for example when the device 108 enters a predefined geographical area or when the current time is within a predefined time window. In an embodiment, the microphone of the device 108 detects a predetermined audio signal, e.g. the "click" sound of the shutter of a SLR camera or a command spoken by the user of the device 108. When the event occurs 402, at least one metadata recording function is activated 403. The recording function may comprise e.g. recording the current location of the device 108 at periodic intervals or recording voice, e.g. speech of the user of the device 108 (and camera 101). Finally, in step 404, the created metadata item(s) along with their timestamp information is (/are) stored for later matching with the captured multimedia data as shown e.g. in the method of FIG. 3a.

In an embodiment, the metadata recording device 108 comprises speech recognition means. Using these means, a pre-defined phrase may be recognized from the speech and translated into a metadata tag. This tag may then be used as any other metadata, for example for characterizing the shot image(s) or for grouping images together.

To a person skilled in the art, the foregoing exemplary embodiments illustrate the model presented in this application whereby it is possible to design different methods and arrangements, which in obvious ways to the expert, utilize the inventive idea presented in this application.

The invention claimed is:

1. A method for transferring multimedia data from a multimedia data capture device to a metadata recording device via a data communication connection and for enhancing the multimedia data using metadata captured by the metadata recording device, the method comprising:
   establishing a data communication connection between the multimedia data capture device and the metadata recording device,
   determining, during the data communication connection, a time difference between a clock of the multimedia data capture device and a clock of the metadata recording device,
   receiving, by the metadata recording device, at least one captured multimedia data item from the multimedia data capture device, the captured multimedia data item comprising multimedia data and a first timestamp indicating the creation time of the captured multimedia data item, the first timestamp being generated by the clock of the multimedia data capture device,
   recording, using the metadata recording device, metadata comprising a second timestamp indicating the creation time of the metadata and geographic location information of the metadata recording device, the second timestamp being generated by the clock of the metadata recording device, and
   associating, by the metadata recording device, the captured multimedia data item with the recorded metadata, wherein the association is utilizing the first and the second timestamps, of which timestamps at least one timestamp is corrected using the determined time difference between the clocks of the multimedia data capturing device and the metadata recording device.

2. A method according to claim 1, wherein the multimedia data capture device is a digital camera or a video camera.

3. A method according to claim 1, wherein the metadata recording device is a mobile terminal.

4. A method according to claim 1, wherein the data communication connection between the data capture device and the metadata recording device is wired connection.

5. A method according to claim 1, wherein the metadata recording device is as a Wireless LAN base station.

6. A method according to claim 1, wherein the metadata recording device comprises data communication means for connecting the device to at least one server computer via a data communication network.

7. A method according to claim 1, wherein the metadata comprises, along with the timestamp information, any of the following:
   information about the geographic location of the device capturing the metadata, and
   streaming data produced by the metadata capturing device.

8. A method according to claim 1, wherein the metadata capturing device comprises means for recognizing a voice command which triggers the creation of additional metadata or executing a command in the metadata capturing device.

9. A method according to claim 1, wherein the method comprises the step of grouping in the metadata capturing device a plurality of captured multimedia data items together based on the associated metadata created in the metadata capturing device.

10. A method according to claim 9, wherein the method comprises steps of creating compressed versions of the multimedia data items of a group and sending the compressed versions of the multimedia data items be sent from the metadata recording device to a server.

11. A method according to claim 10, wherein the method comprises the step of the metadata recording device receiving a request from the server to upload the original version of a compressed multimedia data item.

12. An arrangement comprising a multimedia data capture device connectable to a metadata recording device for transferring multimedia data from the multimedia data capture device to the metadata recording device via a data communication connection and for enhancing the multimedia data using metadata captured by the metadata recording device, wherein the metadata recording device is configured to:
   establish a data communication connection between the multimedia data capture device and the metadata recording device,
   determine, during the data communication connection, a time difference between a clock of the multimedia data capture device and a clock of the metadata recording device,
   receive, by the metadata recording device, at least one captured multimedia data item from the multimedia data capture device, the captured multimedia data item comprising multimedia data and a first timestamp indicating the creation time of the data item, the first timestamp being recorded from the clock of the multimedia data capture device,
   record, using the metadata recording device, metadata comprising a second timestamp indicating the creation time of the metadata and geographic location information of the metadata recording device, the second timestamp being recorded from the clock of the metadata recording device, and
   associate, by the metadata recording device, the captured multimedia data item with the metadata, wherein the association is utilizing the first and the second timestamps, of which timestamps at least one timestamp is corrected using the determined time difference between the clocks of the multimedia data capturing device and the metadata recording device.

13. A computer program embodied on a computer readable non-transitory medium comprising computer executable program code which, when executed by at least one processor of an apparatus for transferring multimedia data from a multimedia data capture device to a metadata recording device via a data communication connection and for enhancing the multimedia data using metadata captured by the metadata recording device, causes the apparatus to perform the steps of:
   establishing a data communication connection between the multimedia data capture device and the metadata recording device,
   determining, during the data communication connection, a time difference between a clock of the multimedia data capture device and a clock of the metadata recording device,
   receiving, by the metadata recording device, at least one captured multimedia data item from the multimedia data capture device, the captured multimedia data item comprising multimedia data and a first timestamp indicating the creation time of the data item, the first timestamp being indicated by the clock of the multimedia data capture device,
   recording, using the metadata recording device, metadata comprising a second timestamp indicating the creation time of the metadata and geographic location information of the metadata recording device, the second timestamp being indicated by the clock of the metadata recording device, and
   associating by the metadata recording device, the captured multimedia data item with the metadata, wherein the association is utilizing the first and the second timestamps, of which timestamps at least one timestamp is corrected using the determined time difference between the clock of the multimedia data capturing device and the clock of the metadata recording device.

14. The method according to claim 2, wherein the time code is generated by the digital camera or the video camera.

15. The method according to claim 1, wherein the second timestamp is recorded by the metadata recording device prior to associating the captured multimedia data item with the recorded metadata.

16. The method of claim 1, further comprising, when the metadata recording device is in an idle state:
   detecting a trigger event;
   activating the metadata recording device; and
   storing the recorded metadata and the second timestamp.

* * * * *